United States Patent
Khadiwala et al.

(10) Patent No.: US 11,321,174 B1
(45) Date of Patent: *May 3, 2022

(54) USING ESTIMATED EFFICIENCY MODELS TO SELECT A PROCESSING UNIT IN A DISTRIBUTED STORAGE NETWORK

(71) Applicant: Pure Storage, Inc., Mountain View, CA (US)

(72) Inventors: Ravi V. Khadiwala, Bartlett, IL (US); Jason K. Resch, Chicago, IL (US)

(73) Assignee: Pure Storage, Inc., Mountain View, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 16/888,761

(22) Filed: May 31, 2020

Related U.S. Application Data

(63) Continuation of application No. 16/256,193, filed on Jan. 24, 2019, now Pat. No. 10,678,640, which is a
(Continued)

(51) Int. Cl.
*G06F 11/00* (2006.01)
*G06F 11/10* (2006.01)
(Continued)

(52) U.S. Cl.
CPC .......... *G06F 11/1076* (2013.01); *G06F 3/061* (2013.01); *G06F 3/064* (2013.01);
(Continued)

(58) Field of Classification Search
CPC .... G06F 11/1076; G06F 3/0619; G06F 3/064; G06F 3/067; G06F 3/061; G06F 3/0635; G06F 3/0653; H04L 67/1097
See application file for complete search history.

(56) References Cited

U.S. PATENT DOCUMENTS

| | | | | |
|---|---|---|---|---|
| 4,092,732 A | * | 5/1978 | Ouchi | G06F 11/1076 714/5.11 |
| 5,237,567 A | * | 8/1993 | Nay | G06F 13/374 370/438 |

(Continued)

OTHER PUBLICATIONS

Chung; An Automatic Data Segmentation Method for 3D Measured Data Points; National Taiwan University; pp. 1-8; 1998.
(Continued)

*Primary Examiner* — Esaw T Abraham
(74) *Attorney, Agent, or Firm* — Garlick & Markison; Timothy W. Markison; Timothy D. Taylor

(57) ABSTRACT

A method for execution by a computing device of a dispersed or distributed storage network begins or continues by, for a data access request, accessing a plurality of estimated efficiency models of a plurality of processing units of the storage network, where an estimated efficiency model of the plurality of estimated efficiency models includes a list of estimated efficiency probabilities, and the list of estimated efficiency probabilities corresponds to a list of data access request types for a processing unit of the plurality of processing units. The method continues by selecting one of the processing units from the plurality of processing units based on the plurality of estimated efficiency models to produce a selected processing unit. The method continues by sending the data access request to the selected processing unit for execution.

13 Claims, 7 Drawing Sheets

Related U.S. Application Data continuation of application No. 15/841,070, filed on Dec. 13, 2017, now Pat. No. 10,268,545, which is a continuation-in-part of application No. 15/399,579, filed on Jan. 5, 2017, now Pat. No. 9,910,732, which is a continuation of application No. 14/805,637, filed on Jul. 22, 2015, now Pat. No. 9,591,076.

(60) Provisional application No. 62/047,458, filed on Sep. 8, 2014.

(51) Int. Cl.
*H04L 67/1097* (2022.01)
*G06F 3/06* (2006.01)

(52) U.S. Cl.
CPC ............ *G06F 3/067* (2013.01); *G06F 3/0635* (2013.01); *G06F 11/1092* (2013.01); *H04L 67/1097* (2013.01); *G06F 3/0619* (2013.01); *G06F 3/0653* (2013.01); *G06F 2211/1028* (2013.01)

(56) References Cited

U.S. PATENT DOCUMENTS

| | | | |
|---|---|---|---|
| 5,454,101 A | 9/1995 | Mackay | |
| 5,485,474 A | 1/1996 | Rabin | |
| 5,774,643 A * | 6/1998 | Lubbers | G06F 11/1076 711/114 |
| 5,802,364 A | 9/1998 | Senator | |
| 5,809,285 A | 9/1998 | Hilland | |
| 5,890,156 A | 3/1999 | Rekieta | |
| 5,987,622 A | 11/1999 | Lo Verso | |
| 5,991,414 A * | 11/1999 | Garay | H04L 9/302 380/30 |
| 6,012,159 A * | 1/2000 | Fischer | H03M 13/13 714/755 |
| 6,058,454 A | 5/2000 | Gerlach | |
| 6,128,277 A | 10/2000 | Bruck | |
| 6,175,571 B1 | 1/2001 | Haddock | |
| 6,192,472 B1 * | 2/2001 | Garay | H04L 9/302 713/153 |
| 6,256,688 B1 | 7/2001 | Suetaka | |
| 6,272,658 B1 | 8/2001 | Steele | |
| 6,301,604 B1 | 10/2001 | Nojima | |
| 6,356,949 B1 * | 3/2002 | Katsandres | G06F 9/547 709/203 |
| 6,366,995 B1 * | 4/2002 | Vilkov | G11C 29/72 711/206 |
| 6,374,336 B1 | 4/2002 | Peters | |
| 6,415,373 B1 | 7/2002 | Peters | |
| 6,418,539 B1 | 7/2002 | Walker | |
| 6,449,688 B1 | 9/2002 | Peters | |
| 6,567,948 B2 | 5/2003 | Steele | |
| 6,571,282 B1 | 5/2003 | Bowman-Amuah | |
| 6,609,223 B1 | 8/2003 | Wolfgang | |
| 6,718,361 B1 | 4/2004 | Basani | |
| 6,760,808 B2 | 7/2004 | Peters | |
| 6,785,768 B2 | 8/2004 | Peters | |
| 6,785,783 B2 | 8/2004 | Buckland | |
| 6,826,711 B2 | 11/2004 | Moulton | |
| 6,879,596 B1 | 4/2005 | Dooply | |
| 7,003,688 B1 | 2/2006 | Pittelkow | |
| 7,024,451 B2 | 4/2006 | Jorgenson | |
| 7,024,609 B2 | 4/2006 | Wolfgang | |
| 7,080,101 B1 * | 7/2006 | Watson | G06F 16/2282 |
| 7,103,824 B2 | 9/2006 | Halford | |
| 7,103,915 B2 | 9/2006 | Redlich | |
| 7,111,115 B2 | 9/2006 | Peters | |
| 7,140,044 B2 | 11/2006 | Redlich | |
| 7,146,644 B2 | 12/2006 | Redlich | |
| 7,171,493 B2 | 1/2007 | Shu | |
| 7,222,133 B1 | 5/2007 | Raipurkar | |
| 7,240,236 B2 | 7/2007 | Cutts | |
| 7,272,613 B2 | 9/2007 | Sim | |
| 7,299,325 B1 | 11/2007 | Waterhouse | |
| 7,636,724 B2 | 12/2009 | De La Torre | |
| 8,601,556 B2 * | 12/2013 | Kanekar | H04L 9/3268 726/6 |
| 8,621,540 B2 * | 12/2013 | Apsangi | H04L 63/20 725/116 |
| 2002/0062422 A1 | 5/2002 | Butterworth | |
| 2002/0166079 A1 | 11/2002 | Ulrich | |
| 2003/0018927 A1 | 1/2003 | Gadir | |
| 2003/0037261 A1 | 2/2003 | Meffert | |
| 2003/0065617 A1 | 4/2003 | Watkins | |
| 2003/0084020 A1 | 5/2003 | Shu | |
| 2004/0024963 A1 | 2/2004 | Talagala | |
| 2004/0122917 A1 * | 6/2004 | Menon | H04L 67/1002 709/219 |
| 2004/0215998 A1 | 10/2004 | Buxton | |
| 2004/0228493 A1 | 11/2004 | Ma | |
| 2005/0100022 A1 | 5/2005 | Ramprashad | |
| 2005/0114594 A1 | 5/2005 | Corbett | |
| 2005/0125593 A1 | 6/2005 | Karpoff | |
| 2005/0131993 A1 | 6/2005 | Fatula, Jr. | |
| 2005/0132070 A1 | 6/2005 | Redlich | |
| 2005/0144382 A1 | 6/2005 | Schmisseur | |
| 2005/0229069 A1 | 10/2005 | Hassner | |
| 2006/0047907 A1 | 3/2006 | Shiga | |
| 2006/0136448 A1 | 6/2006 | Cialini | |
| 2006/0156059 A1 | 7/2006 | Kitamura | |
| 2006/0224603 A1 | 10/2006 | Correll, Jr. | |
| 2007/0079081 A1 | 4/2007 | Gladwin | |
| 2007/0079082 A1 | 4/2007 | Gladwin | |
| 2007/0079083 A1 | 4/2007 | Gladwin | |
| 2007/0088970 A1 | 4/2007 | Buxton | |
| 2007/0174192 A1 | 7/2007 | Gladwin | |
| 2007/0180296 A1 | 8/2007 | Byrne et al. | |
| 2007/0214285 A1 | 9/2007 | Au | |
| 2007/0234110 A1 | 10/2007 | Soran | |
| 2007/0283167 A1 | 12/2007 | Venters, III | |
| 2008/0282128 A1 | 11/2008 | Lee et al. | |
| 2009/0094251 A1 | 4/2009 | Gladwin | |
| 2009/0094318 A1 | 4/2009 | Gladwin | |
| 2010/0023524 A1 * | 1/2010 | Gladwin | G06F 3/0659 707/E17.032 |
| 2010/0306621 A1 | 12/2010 | Cassidy | |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

(56) References Cited

OTHER PUBLICATIONS

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

\* cited by examiner

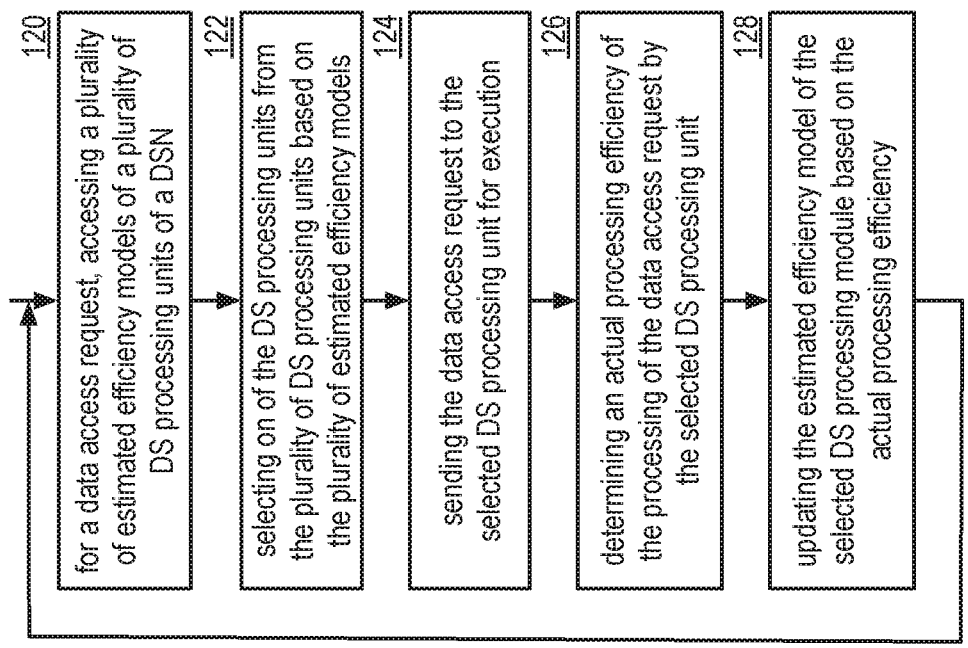

USING ESTIMATED EFFICIENCY MODELS TO SELECT A PROCESSING UNIT IN A DISTRIBUTED STORAGE NETWORK

CROSS-REFERENCE TO RELATED APPLICATIONS

The present U.S. Utility Patent application claims priority pursuant to 35 U.S.C. § 120 as a continuation of U.S. Utility application Ser. No. 16/256,193, entitled "USING REINFORCEMENT LEARNING TO SELECT ADS PROCESSING UNIT", filed Jan. 24, 2019, issuing issued as U.S. Pat. No. 10,678,640 on Jun. 9, 2020, which is a continuation of U.S. Utility application Ser. No. 15/841,070, entitled "USING REINFORCEMENT LEARNING TO SELECT A DS PROCESSING UNIT", filed Dec. 13, 2017, issued as U.S. Pat. No. 10,268,545 on Apr. 23, 2019, which is a continuation-in-part of U.S. Utility application Ser. No. 15/399,579, entitled "MAINTAINING A DESIRED NUMBER OF STORAGE UNITS", filed Jan. 5, 2017, issued as U.S. Pat. No. 9,910,732 on Mar. 6, 2018, which is a continuation of U.S. Utility application Ser. No. 14/805,637, entitled "MAINTAINING A DESIRED NUMBER OF STORAGE UNITS", filed Jul. 22, 2015, issued as U.S. Pat. No. 9,591,076 on Mar. 7, 2017, which claims priority pursuant to 35 U.S.C. § 119(e) to U.S. Provisional Application No. 62/047,458, entitled "SELECTING RESOURCES IN A DISPERSED STORAGE NETWORK", filed Sep. 8, 2014, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersed storage data processing.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 11 is a flowchart illustrating an example of a method of using estimated efficiency models in selecting a dispersed storage (DS) processing unit in accordance with the present invention.

DETAILED DESCRIPTION OF THE INVENTION

Figure 1:
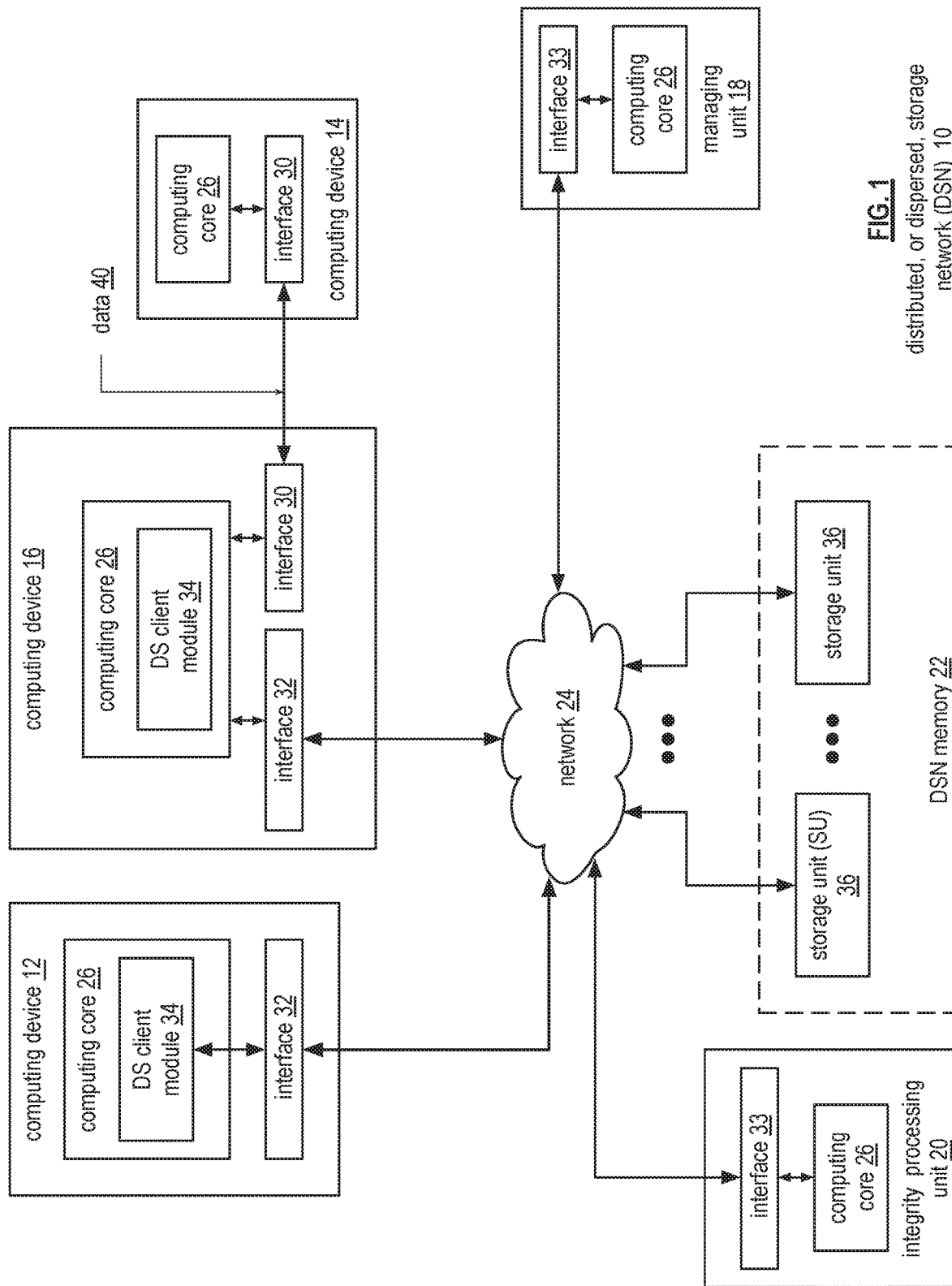
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
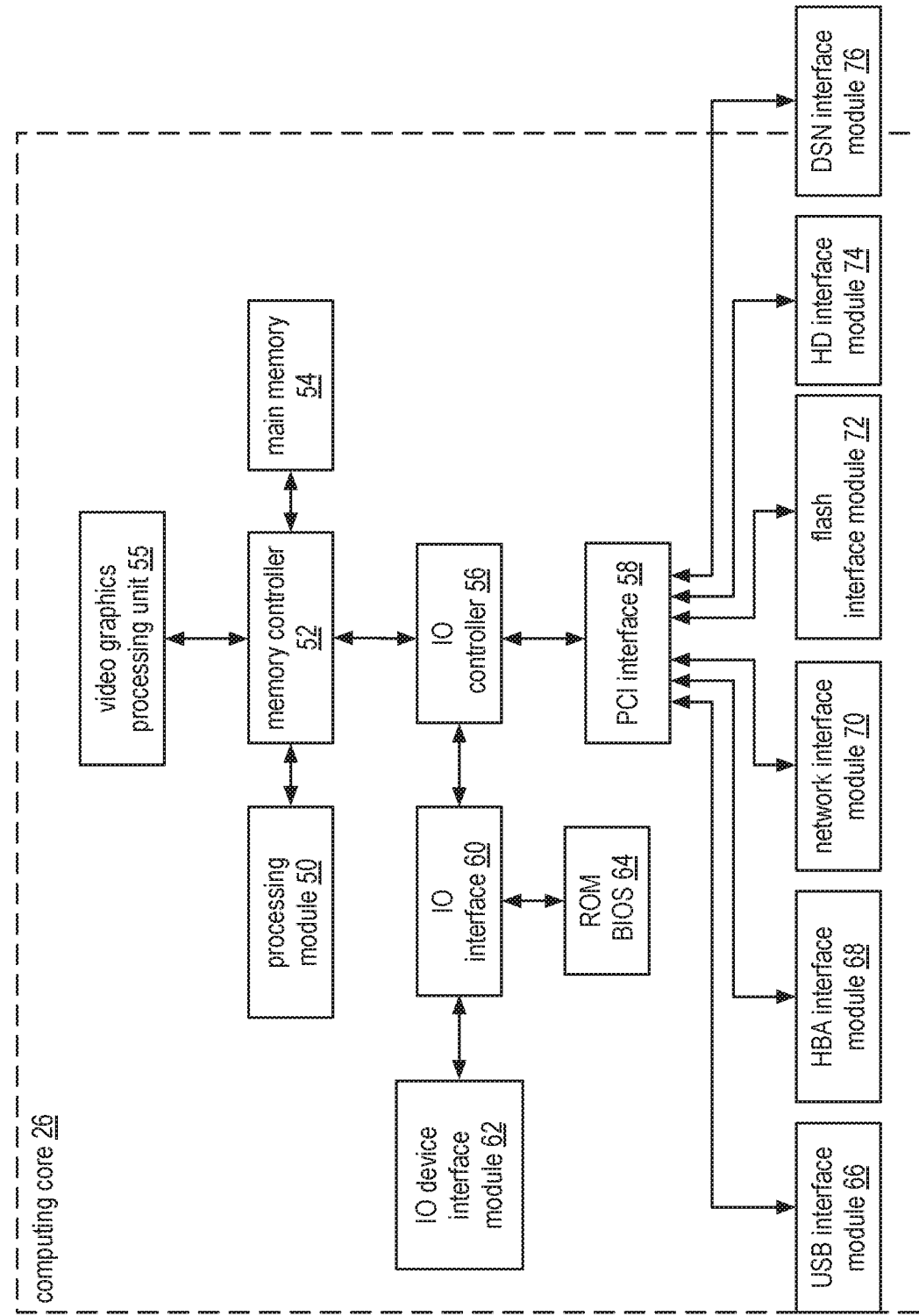
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data 40 as subsequently described with reference to one or more of FIGS. 3-8. In this example embodiment, computing device 16 functions as a dispersed storage processing agent for computing device 14. In this role, computing device 16 dispersed storage error encodes and decodes data (e.g., data 40) on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4, 5, 6:
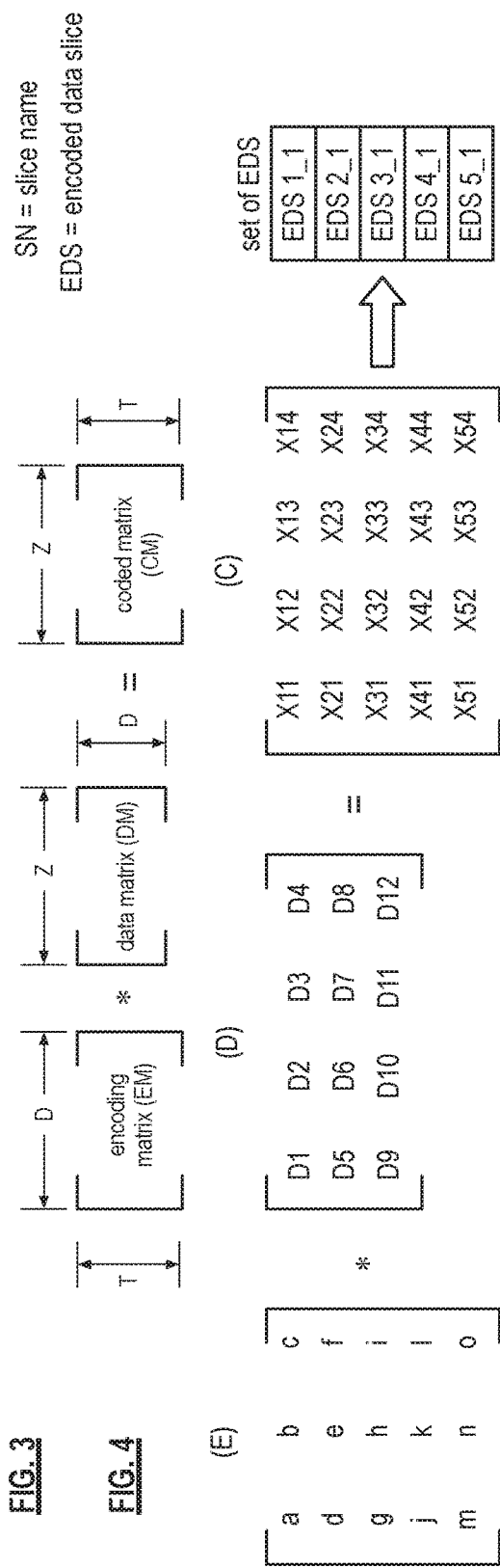
FIG. 3 is a schematic block diagram of an example of dispersed storage error encoding of data in accordance with the present invention.
FIG. 4 is a schematic block diagram of a generic example of an error encoding function in accordance with the present invention.
FIG. 5 is a schematic block diagram of a specific example of an error encoding function in accordance with the present invention.
FIG. 6 is a schematic block diagram of an example of a slice name of an encoded data slice (EDS) in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
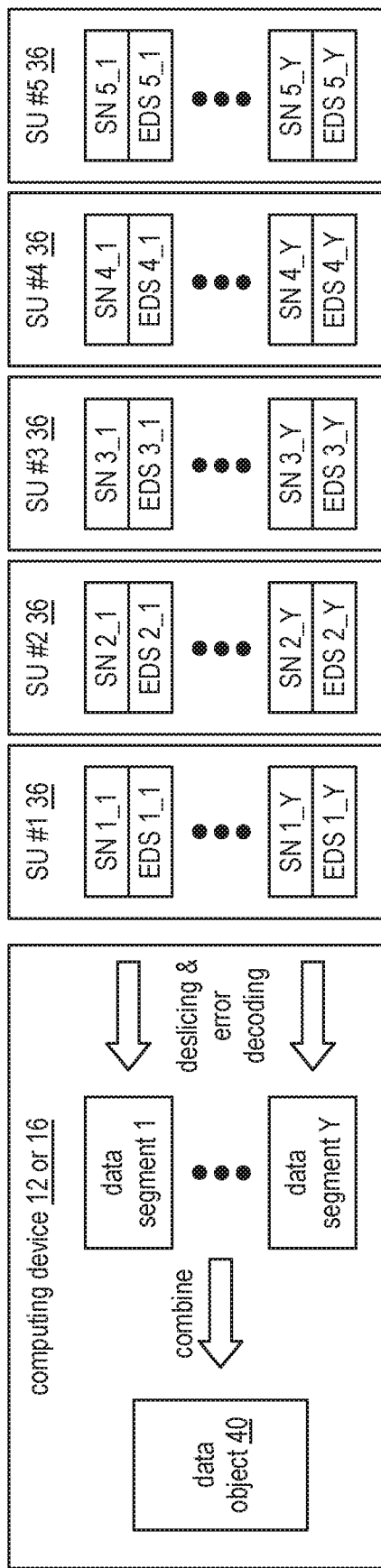
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
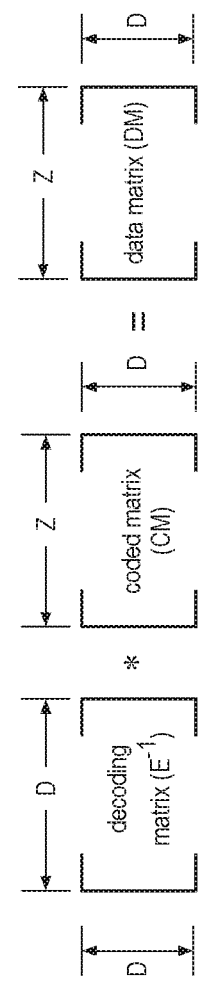
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
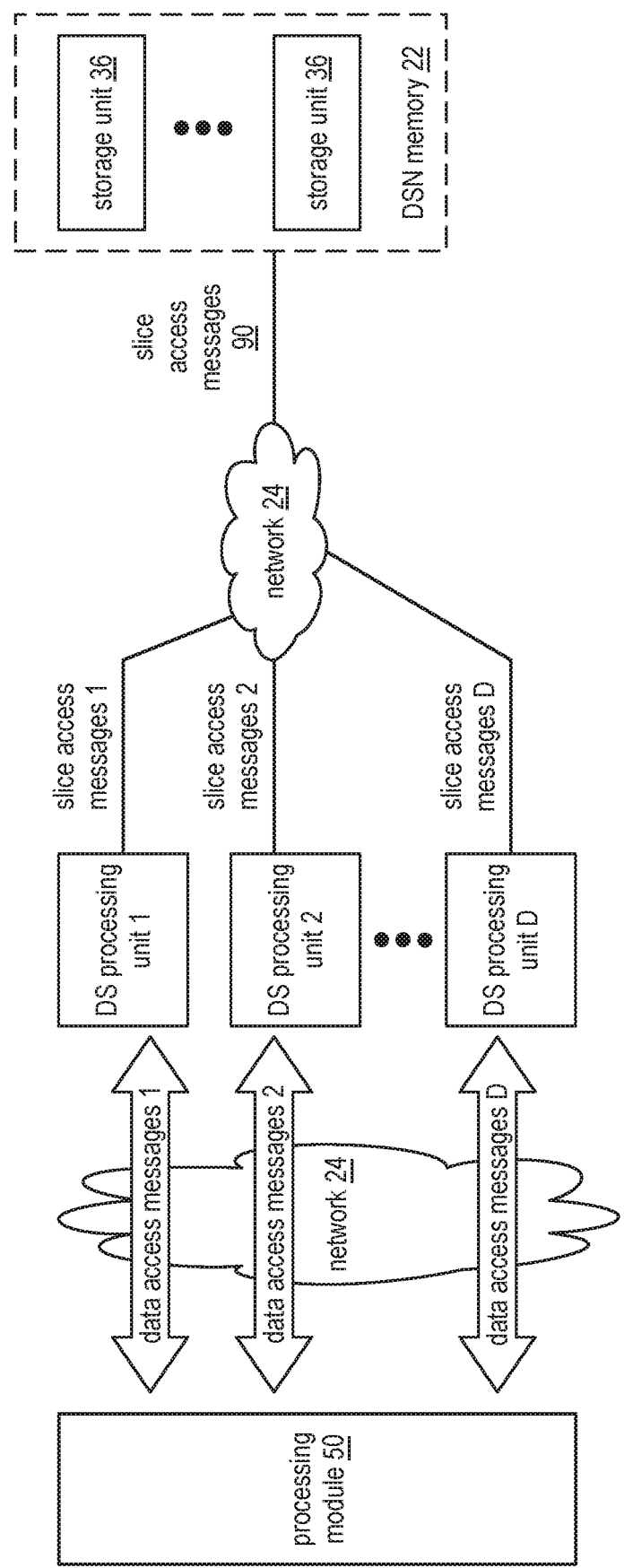
FIG. 9 is a schematic block diagram of another embodiment of a dispersed storage network (DSN) in accordance with the present invention.

FIG. 9 is a schematic block diagram of another embodiment of a dispersed storage network (DSN) that includes the processing module 50 of FIG. 2, the network 24 of FIG. 1, a plurality of dispersed storage (DS) processing units 1-D, and the DSN memory 22 of FIG. 1. Each DS processing unit may be implemented utilizing the computing device 16 of FIG. 1. The DSN memory 22 includes a plurality of storage units 36 of FIG. 1. The DSN functions to select a resource to access the DSN memory 22 while storing and retrieving data. In particular, the plurality of DS processing units 1-D provides a plurality of access resources enabling the processing module 50 to access the DSN memory 22.

In an example of operation of selecting the resource, the processing module 50 generates a data access request for DSN memory. The generating includes determining to access the DSN memory and generating the data access request as a data access message. Having generated the data access request, the processing module 50 identifies the plurality of DS processing units 1-D, where each DS processing unit is capable of accepting the data access request to facilitate accessing the DSN memory by the processing module 50. The identifying includes at least one of initiating a query, interpreting a received query response, performing a lookup, interpreting historical records of access, and interpreting system registry information.

For each DS processing unit, the processing module 50 determines an expected data access processing capacity level. The determining may be based on one or more of a present loading level of the DS processing unit, a number of requesters utilizing the DS processing unit, an expected impact level on the DS processing unit to process the data access request, actual loading levels associated with the execution of one or more previous data access requests, and an expected impact due to conflicts and/or retries that may occur by selecting the DS processing unit.

Having determined expected data access processing capacity levels, the processing module 50 identifies an expected optimum DS processing unit based on the expected data access processing capacity levels of the DS processing units. For example, the processing module 50 identifies a DS processing unit associated with a lowest present loading level. For remaining DS processing units of the plurality of DS processing units, the processing module 50 determines a probability level that the remaining DS processing unit is an actual most optimum DS processing unit to identify a next expected optimum DS processing unit. For example, the processing module 50 identifies the remaining DS processing unit based on previous selections of the DS processing units and actual subsequent processing performance levels. For instance, the processing module 50 identifies a second-best DS processing unit selection based on a second lowest present loading level.

Having determined the probability levels, the processing module 50 selects one of the expected optimum DS processing unit and the next expected optimum DS processing unit as a selected DS processing unit in accordance with a selection approach. The selection approach includes at least one of a random approach, always select the expected optimum DS processing unit, always select the next expected optimum DS processing unit, select the next optimum DS processing unit when the associated probability level is greater than a selection probability threshold level, and selecting combinations of the expected optimum DS processing unit and the next expected optimum DS processing unit to collect more performance information. For instance, the processing module 50 selects DS processing unit 2 for a subsequent 10 data access messages when the DS processing unit 2 is the expected optimum DS processing unit and then selects DS processing unit 4 for a next 5 data access messages when the DS processing unit 4 is the next expected optimum DS processing unit to gather subsequent performance information for future selections.

Having produced the selected DS processing unit, the processing module 50 facilitates processing of the data access request utilizing the selected DS processing unit. As a specific example, the processing module 50 sends, via the network 24, the data access request as a data access message 5 to the DS processing unit 5 when the DS processing unit 5 is the selected DS processing unit. The DS processing unit 5 issues slice access request messages 5 (e.g., as slice access messages 90), via the network 24, to the DSN memory 22, receives slice access response messages 5, and issues a data access response message, via the network 24, to the processing module 50 based on the received slice access response messages 5.

Figure 10:
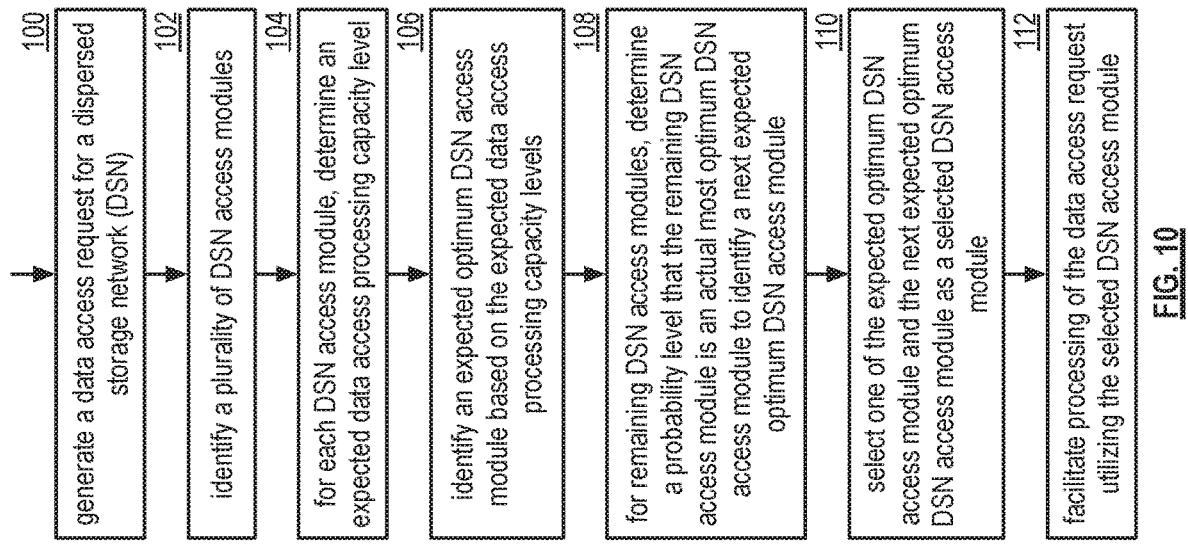
FIG. 10 is a flowchart illustrating an example of selecting a resource in accordance with the present invention.

FIG. 10 is a flowchart illustrating an example of selecting a resource. The method begins at step 100, where a processing module (e.g., of a user computing device (e.g., computing device 12-16 of FIG. 1) generates a data access request for a dispersed storage network (DSN) memory. The generating includes determining to access the DSN memory, and generating the data access request as at least one of a store data request and a retrieve stored data request.

The method continues at step 102, where the processing module identifies a plurality of DSN access modules (e.g., DS processing units), where each DSN access module is capable of enabling the processing module to access the DSN memory. For example, the processing module determines DSN access modules capable of processing the data access request based on one or more of performing a lookup, interpreting system registry information, issuing a query, and interpreting a received query response.

For each DSN access module, the method continues at step 104, where the processing module determines an expected data access processing capacity level. The determining may be based on one or more of a present loading level of the DSN access module, a number of requesters utilizing the DSN access module, and the expected impact level of the DSN access module to process the data access request, actual loading levels associated with execution of one or more previous data access request, and the expected impact due to conflicts and/or retries that may occur by selecting the DSN access module.

The method continues at step 106, where the processing module identifies an expected optimum DSN access module based on expected data access processing capacity levels. The identifying may be in accordance with the at least one of an identification approach to optimize speed of processing, to minimize cost the processing, to load level, and to assign to a least busy DSN access module.

For remaining DSN access modules, the method continues at step 108, where the processing module determines a probability level that the remaining DSN access module is an actual most optimum DSN access module to identify a next expected optimum DSN access module. The determining may be based on at least one of previous selections of the DSN access modules and actual subsequent performance levels.

The method continues at step 110, where the processing module selects one of the expected optimum DSN access module and the next expected optimum DSN module as a selected DSN access module. The selecting may be in accordance with a selection approach, where the selection approach is predetermined, requested, or determined as a function of historical performance levels. The method continues at step 112, where the processing module facilitates processing of the data access request utilizing the selected DSN access module. As a specific example, the processing module sends the data access request to the selected DSN access module and receives a data access response in response to the data access request.

FIG. 11 is a flowchart illustrating an example of a method of using estimated efficiency models to select a dispersed storage (DS) processing unit. The method begins or continues with step 120, where for a data access request, a user computing device (e.g., a computing device 12-16 of FIG. 1) of a dispersed storage network (DSN) accesses a plurality of estimated efficiency models of a plurality of dispersed storage (DS) processing units of the DSN. An estimated efficiency model of the plurality of estimated efficiency models includes a list of estimated efficiency probabilities corresponding to a list of data access request types (e.g., write, read, list, etc.) for a DS processing unit of the plurality of DS processing units. In one embodiment, the user computing device creates the plurality of estimated efficiency models. The estimated efficiency models may be based on one or more of historical performance data, estimated performance data, network bandwidth, network reliability, processing resources of the plurality of DS processing units, and data access request volumes.

As an example, an estimated efficiency probability of the list of estimated efficiency probabilities includes an estimated time to complete the data access request by the DS processing unit. As another example, the estimated efficiency probability includes an estimated probability that the estimated time will be met. As another example, the estimated efficiency probability includes an estimated probability of an error occurring when executing the data access request (e.g., triggering a retry or a failure) and an estimated probability of a connection failure prior to fulfillment of the data access request.

The method continues with step 122, where the user computing device selects one of the DS processing units from the plurality of DS processing units based on the plurality of estimated efficiency models, a type of request of the data access request, and a randomizing factor to produce a selected DS processing unit. For example, when the randomizing factor indicates selecting an estimated most efficient processing of the data access request, the user computing device selects the one of the DS processing units having a highest estimated efficiency probability for the type of data access request. As another example, when the randomizing factor indicates selecting an estimated second-most efficient processing of the data access request, the user computing device selects the one of the DS processing units having a second highest estimated efficiency probability for the type of data access request.

As yet another example, when the randomizing factor indicates selecting an estimated third-most efficient processing of the data access request, the user computing device selects the one of the DS processing units having a third highest estimated efficiency probability for the type of data access request. As still yet another example, when the randomizing factor indicates randomly selecting, and when the estimated efficiency processing of the data access request is above an efficiency threshold, the user computing device selects one of the DS processing units at random (e.g., pseudo random, round robin, etc.). In an example of operation, for a write request, the user computing device selects a first DS processing unit that has a lowest estimated time of 90 microseconds (ms) to complete the write request.

The method continues with step 124, where the user computing device sends the data access request to the selected DS processing unit for execution. The method continues with step 126, where the user computing device determines an actual processing efficiency of the processing of the data access request by the selected DS processing unit. For example, the user computing device determines the first DS processing unit completed the write request in 81 ms.

The method continues with step 128, where the user computing device updates the estimated efficiency model of the selected DS processing module based on the actual processing efficiency (e.g., which includes 81 ms for processing of the write request). The method may loop back to step 120 for a second data access request, where the user computing device accesses the plurality of updated estimated efficiency models. For example, the updated estimated efficacy model of the first DS processing unit includes information that first DS processing unit's estimated completion time is 11.11% faster than in the previous model (e.g., (81 ms-90 ms)/81 ms). Note the above method steps may also be performed by a second user computing device of the DSN for the second data access request.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device of a dispersed or distributed storage network comprises:

for a data access request, accessing, a plurality of estimated efficiency models of a plurality of processing units of the storage network, wherein an estimated efficiency model of the plurality of estimated efficiency models includes a list of estimated efficiency probabilities, wherein the list of estimated efficiency probabilities corresponds to a list of data access request types for a processing unit of the plurality of processing units;

selecting one of the processing units from the plurality of processing units based on the plurality of estimated efficiency models to produce a selected processing unit; and sending the data access request to the selected processing unit for execution.

2. The method of claim 1, wherein the selecting one of the processing units from the plurality of processing units further comprises:

selecting the one of the processing units based on a type of request of the data access request.

3. The method of claim 1, wherein the selecting one of the processing units from the plurality of processing units further comprises:

selecting the one of the processing units based on a randomizing factor to produce the selected processing unit.

4. The method of claim 3, wherein the selecting the one of the processing units comprises:

when the randomizing factor indicates selecting an estimated most efficient processing of the data access request, selecting the one of the processing units having a highest estimated efficiency probability for a type of data access request of the list of data access request types.

5. The method of claim 3, wherein the selecting the one of the processing units comprises:

when the randomizing factor indicates selecting an estimated second-most efficient processing of the data access request, selecting the one of the processing units having a second highest estimated efficiency probability for the type of data access request; and when the randomizing factor indicates selecting an estimated third-most efficient processing of the data access request, selecting the one of the processing units having a third highest estimated efficiency probability for the type of data access request.

6. The method of claim 3, wherein the selecting the one of the processing units comprises:

when the randomizing factor indicates randomly selecting, and when the estimated efficiency processing of the data access request is above an efficiency threshold, selecting the one of the processing units at random.

7. The method of claim 1 further comprises:

creating, by the computing device, the plurality of estimated efficiency models based on one or more of historical performance data, estimated performance data, network bandwidth, network reliability, processing resources of the plurality of processing units, and data access request volumes.

8. The method of claim 1, wherein an estimated efficiency probability of the list of estimated efficiency probabilities comprises one or more of:

an estimated time to complete the data access request by the processing unit;

an estimated probability that the estimated time will be met;

an estimated probability of an error occurring when executing the data access request; and an estimated probability of a connection failure prior to fulfillment of the data access request.

9. The method of claim 1 further comprises:

for a second data access request, accessing, by a second computing device of the storage network, a second plurality of estimated efficiency models of the plurality of processing units;

selecting, by the second computing device, a second one of the processing units from the plurality of processing units based on the second plurality of estimated efficiency models to produce a second selected processing unit; and sending, by the second computing device, the second data access request to the second selected processing unit for execution.

10. The method of claim 9 further comprises:

determining, by the second computing device, a second actual processing efficiency of a second processing of the second data access request by the second selected processing unit; and updating, by the second computing device, the estimated efficiency model of the second selected processing unit based on the second actual processing efficiency.

11. The method of claim 1 further comprises:

for a second data access request, accessing, by the computing device, the plurality of estimated efficiency models;

selecting, by the computing device, a second one of the processing units from the plurality of processing units based on the plurality of estimated efficiency models, a type of request of the second data access request, and a randomizing factor to produce a second selected DS processing unit; and sending, by the computing device, the second data access request to the second selected processing unit for execution.

12. The method of claim 11 further comprises:

determining, by the computing device, a second actual processing efficiency of a second processing of the second data access request by the second selected processing unit; and updating, by the computing device, the estimated efficiency model of the second selected processing unit based on the second actual processing efficiency.

13. The method of claim 1 further comprises:

determining, by the computing device, an actual processing efficiency of a processing of the data access request by the selected processing unit; and updating, by the computing device, the estimated efficiency model of the selected processing unit based on the actual processing efficiency.

\* \* \* \* \*